(12) United States Patent
More et al.

(10) Patent No.: US 10,660,337 B2
(45) Date of Patent: May 26, 2020

(54) STABLE AGROCHEMICAL COMPOSITION AND PROCESS THEREOF

(71) Applicant: UPL LTD, Haldia (IN)

(72) Inventors: Pravin More, Mumbai (IN); Paresh Talati, Mumbai (IN); Jaidev Rajnikant Shroff, Dubai (AE); Vikram Rajnikant Shroff, Dubai (IN)

(73) Assignee: UPL LIMITED, Haldia, West Bengal (IN)

( * ) Notice: Subject to any disclaimer, the term of this patent is extended or adjusted under 35 U.S.C. 154(b) by 0 days.

(21) Appl. No.: 15/991,862

(22) Filed: May 29, 2018

(65) Prior Publication Data

US 2018/0368412 A1    Dec. 27, 2018

(51) Int. Cl.
| | | |
|---|---|---|
| *A01N 53/00* | (2006.01) | |
| *A01N 37/50* | (2006.01) | |
| *A01N 57/28* | (2006.01) | |
| *A01N 25/22* | (2006.01) | |
| *A01N 25/12* | (2006.01) | |

(52) U.S. Cl.
CPC ............ *A01N 53/00* (2013.01); *A01N 37/50* (2013.01); *A01N 57/28* (2013.01); *A01N 25/12* (2013.01); *A01N 25/22* (2013.01); *A01N 2300/00* (2013.01)

(58) Field of Classification Search
CPC .............................. A01N 25/10; A01N 53/00
See application file for complete search history.

(56) References Cited

U.S. PATENT DOCUMENTS

| | | | |
|---|---|---|---|
| 8,142,802 B2 * | 3/2012 | Jadhav | A01N 53/00 |
| | | | 424/405 |
| 8,754,053 B2 * | 6/2014 | Pitterna | A01N 43/80 |
| | | | 514/30 |

FOREIGN PATENT DOCUMENTS

WO    WO02/076213    * 10/2002

OTHER PUBLICATIONS

Wei et al. CAS: 157: 156027, 2012.*

* cited by examiner

*Primary Examiner* — Rei Tsang Shiao
(74) *Attorney, Agent, or Firm* — IP Pundit LLC

(57) ABSTRACT

An agrochemical composition comprising at least one low melting active ingredient; at least one moisture sensitive active ingredient; and an additive, characterised in that said additive has a softening point or melting point lower than the melting point of said low melting active ingredient; a process for the preparation thereof, a method of use thereof and a kit comprising the same is disclosed.

7 Claims, No Drawings

STABLE AGROCHEMICAL COMPOSITION AND PROCESS THEREOF

FIELD OF THE INVENTION

The present invention relates to a stable agrochemical composition. The present invention more particularly relates to stable agrochemical composition comprising a low melting active ingredient and a moisture sensitive active ingredient.

BACKGROUND AND THE PRIOR ART

Physically compatible agrochemical mixtures exhibit better pest management. These mixtures show multifaceted advantages than when applied individually. But achieving physical compatibility becomes major challenge while combining two or more agrochemicals. The problem of physical compatibility further aggravates when low melting active ingredient needs to be formulated with another active ingredient.

Some of the low melting active ingredients like pyrethroids (synthetic pyrethrins) are known to control agricultural insect pests on crops. Pyrethroids interfere with the ionic conductance of nerve members by prolonging the sodium current. This stimulate nerves to discharge repeatedly causing hyper-excitability in poisoned animals.

Active ingredients having pest control ability selected from fungicides such as strobilurins and insecticides such as organophosphates are advantageous to be co-formulated with low melting actives for better pest management. Some of these active ingredients are moisture sensitive and thus rapidly degrade while processing into a suitable formulation or composition.

Moisture sensitive active ingredient, such as Acephate (organophosphate) is a systemic and contact insecticide of moderate persistence with residual activity lasting about 10-15 days. Acephate, being highly prone to moisture and is not very stable in conventional pesticidal formulations, such that a vigorous decomposition of acephate in conventional formulations takes place depending on storage conditions and, as a result, the insecticidal activity of acephate sometimes cannot be fully utilized.

Though it is advantageous to co-formulate moisture sensitive active ingredients with low melting active ingredients for better pest management, it is challenging to develop stable as well as efficacious formulation.

There are large number of low melting active ingredient formulations that are being used for combating pest attacks on plants. Available formulations include emulsion concentrates (EC), aqueous emulsion (ES). But, these formulations cannot be prepared when another active ingredient is moisture sensitive and is prone to water.

Dry granular formulations such as water dispersible granules of low melting active ingredients like pyrethroids have been known and are in practice. The conventional ways of preparing granules include methods like extrusion granulation wherein a dough is prepared using water which is then subjected to granulation. Another way of preparing the granules is to make a slurry in water and then subject it to spray drying.

When the low melting ingredients like pyrethroids have to be combined in a pre-mix with a moisture sensitive ingredients like organophosphates, it becomes a challenge to do so as the moisture sensitive ingredient cannot be granulated using water. Moreover, rise in temperature during extrusion granulation may melt low melting actives. Once granules are extruded and kept in ambient conditions, low melting actives become solid again. This solid-liquid-solid phase change result into altered morphology leading to changed crystal form, or a layering of the ingredient on the surface of the granules or the granules may become hard. This granular composition when applied in fields by way of dilution/tank mixing yields unsatisfactory non-uniform dissolution (dispersion) of the composition with lack of homogeneity in the resulting mixture and prevents distribution of constant concentration of the desired active in the fields. Lack of dispersion in desired manner will reduce the availability of the active ingredient for the intended use as pesticide thereby making the product ineffective.

Another method which is employed for making a pre-mix of such ingredients is to dissolve the low melting ingredient into suitable solvent and then mix it with the moisture sensitive ingredient and then granulate. This method requires use of large amount of organic solvents which are not only expensive but are not environmentally friendly. The granules may have to be subjected to longer drying period in order to remove the traces of solvent from the final product.

WO2015142609 A1 discloses micro particles comprising water soluble organothiophosphate (e.g. Acephate) and pyrethroids (e.g. Bifenthrin). The invention presents effective odor control solution by adding odor-absorbing and odor-masking components.

US20090208423 discloses synergistic insecticidal composition comprising imidacloprid, lambda-cyhalothrin and a conventional agriculturally acceptable carrier or excipient formulated as an aqueous formulation or dry based formulations. The application also discloses a process of mixing the actives and the excipients to obtain a homogenous mixture of all ingredients, which is micronized and granulated to yield the granular formulation. While this process is acceptable, micronizing the inert fillers in which liquid active is absorbed can pose several problems since the liquid naturally tends to come out during fine grinding. Such compositions obtained do not generally exhibit good dispersibility and shelf life especially since the low melting actives undergoes a phase change during the ambient storage temperatures (−5 to 50° C.) leading to caking and crystal growth.

Indian Patent Application No. 1709/MUM/2010 discloses synergistic insecticidal composition of acephate and bifenthrin wherein bifenthrin technical dissolved in solubilizer was sprayed onto the mixture of acephate technical and formulation auxiliaries to obtain granules. The problem with this method is large amount of solubilizer required by bifenthrin that imparts softness to the finished granules. In this case, high loading of active ingredients is not possible due to undesirable softness of granules.

WO2002076213 A1 discloses a pesticidal composition comprising specified pyrethroids and organophosphates in a weight ratio of 50:1 to 1:5 wherein a pyrethroid is selected from deltamethrin, fenvalerate, esfenvalerate, cyfluthrin, beta-cyfluthrin and bifenthrin, and an organophosphate insecticide selected from triazophos, profenofos, chlorpyrifos-methyl, monocrotofos, acephate, methamidophos and diethyl 1-phenyl-1H-1,2,4-triazol-3-yl phosphate.

Although various efforts had been taken in the past to develop a stable pesticidal composition containing low melting active ingredients and moisture sensitive active ingredients, there is still a long felt need to develop an alternative, simple and an efficient product and a process for developing the stable pesticidal compositions of these active ingredients. Also, there is a need for developing such formulations, wherein the formulation overcomes drawbacks of the prior art and exhibits increased stability with respect to degradation of moisture sensitive actives and dispersibility/suspensibility of low melting active ingredient in combination. The physical stability of the formulation during storage/use is a key problem in the art and the same is to be addressed.

OBJECTIVES

It is an objective of the invention to provide an agrochemical composition comprising a low melting active ingredient and a moisture sensitive active ingredient.

Another objective of the invention to provide an agrochemical composition comprising a low melting active ingredient and a moisture sensitive active ingredient which is stable.

Another object of the present invention is to provide methods of controlling pests using the compositions of the present invention.

Yet another objective of the present invention is to provide a non-dusty, free flowing, storage stable dry composition comprising at least one low melting active ingredient and a moisture sensitive active ingredient.

SUMMARY OF THE INVENTION

In accordance with the above objectives, the present invention provides a stable agrochemical composition comprising:
a) at least one low melting active ingredient;
b) at least one moisture sensitive active ingredient; and
c) an additive;
characterised in that said additive has a softening point or melting point lower than the melting point of said low melting active ingredient.

In accordance with the above objectives, the present invention provides a process of preparing stable agrochemical composition comprising at least one low melting active ingredient, at least one moisture sensitive active ingredient and an additive wherein in the additive has a softening point or melting point lower than the melting point of said low melting active ingredient.

In accordance with the above objectives, the present invention provides use of stable compositions according to the present invention as an agrochemical composition.

In accordance with the above objectives, the present invention further provides a method of controlling unwanted pests, said method comprising applying an agrochemically effective amount of stable compositions according to the present invention to the pests or to their locus.

Additional features and advantages of the present invention will be apparent from the detailed description that follows, which illustrates by way of example, the most preferred features of the present invention which are not to be construed as limiting the scope of the invention described herein.

DETAILED DESCRIPTION OF THE INVENTION

Inventors of the present invention have surprisingly found that a stable agrochemical composition in the form a granular composition of a low melting active ingredient and a moisture sensitive active ingredient can be prepared by mixing the low melting active ingredient with a moisture sensitive active ingredient in the presence of an additive and exposing the pre-mix to compact granulation.

It has been found out surprisingly that the additive used by the inventors prevents the low melting active ingredient from undergoing crystal modifications or forming a crust on the granules. It is indeed surprising that the additive of the present invention allows the storage of the product under any conditions and still maintain the quality of the product without any deterioration in the dispersibility, suspensibility and availability of the active.

It is an accepted method to test the formulation for long term stability and performance to allow the formulation to be kept at 54 degrees for 14 days called as accelerated heat stability (AHS) test and then test the dispersibility, suspensibility and wet sieve test. Drop in suspensibility and dispersibility indicate the poor performance of the formulation in the field after long term storage and increase in wet sieve test indicate the formation of large particles which in the field will clog the nozzle.

It is observed by the inventors that the formulation of the present invention passes all the tests after AHS thereby proving its effectiveness in the field even after long term storage. It is believed that the additive used during the process enables the formulation to remain stable for longer duration on storage.

As used herein the term 'composition' is used interchangeably with the term 'formulation' and is intended to refer to the stable solid dry flowable intended to prevent damage of agricultural crops and its produce from insects and pests.

Compounds are referred to herein as "low melting active ingredient," which is a term recognized in the relevant art, particularly in the field of agrochemical compositions. In particular, a low melting active compound according to the present invention is a compound that has a melting point of less than about 100° C., less than about 90° C., less than about 85° C., less than about 80° C., less than about 75° C., or less than about 70° C. or having ability to solidify on room temperature. In certain embodiments, a low melting compound according to the invention is a compound with a melting point in the range of about 20° C. to about 100° C. In specific embodiments, a low melting compound is a compound that has a melting point in the range of about 25° C. to about 100° C., about 30° C. to about 100° C., about 30° C. to about 90° C., about 30° C. to about 80° C., about 30° C. to about 70° C., about 40° C. to about 90° C., about 40° C. to about 80° C., about 50° C. to about 90° C., about 50° C. to about 80° C., or about 50° C. to about 70° C.

The term 'moisture sensitive active ingredient refers to a compound having ability to absorb moisture and undergoes degradation or other changes in physico-chemical parameters.

As used herein, the term "compaction granulation" denotes a process of granulation wherein compositions comprising active ingredients is separately, sequentially or simultaneously subjected to compaction by applying pressure as well as to granulation by suitable mechanism such as extrusion.

As used herein, the term "degradation" denotes loss of the active ingredient as a result of exposure to moisture/or on storage.

The term 'softening point' denotes the temperature at which the additive reaches a specific degree of softness. The 'softening point' is close to but lower than the melting point of the additive.

The term "locus" as used herein refers to a place to which a combination according to the invention is applied. It includes application to an individual plant, a group of plants such as a plant and/or its surrounding, and the region in which plants may be planted as well application directly to an insect or insects and/or the vicinity in which they are located.

The term "agrochemical" in the context of this invention refers to any agent used to destroy insects, arachnids, fungi, unwanted vegetation, rodents, and other pests.

The term "insects" includes all organisms in the class "Insecta." "Insecticidal" refers to the ability of a substance to increase mortality or inhibit, growth rate of insects.

The term 'plants' refers to all physical parts of a plant, including seeds, seedlings, saplings, roots, tubers, stems, stalks, foliage and fruits.

The term "agrochemically effective amount of active" refers to an amount of an active that kills or inhibits the plant disease for which control is desired, in an amount not significantly toxic to the plant being treated.

To "control" or "controlling" insects means to inhibit, through a toxic effect, the ability of insect pests to survive, grow, feed, and/or reproduce, or to limit insect-related damage or loss in crop plants. To "control" insects may or may not mean killing the insects, although it preferably means killing the insects.

The inventors of the present invention have found that the addition of an additive to a composition of a moisture sensitive active ingredient, preferably an organophosphorus insecticide, and a low melting active ingredient resulted in highly stable compositions. The stable composition achieved by addition of an additive facilitated granule formation in the absence of water. Thus, the present invention provides for compositions that allows avoiding the use of water.

Without wishing to be bound by theory, the inventors in the present invention have surprisingly found, that addition of a low softening or low melting additive to a combination of low melting active ingredient such as pyrethroids and moisture sensitive active ingredients such as organophosphorus insecticide results in stable granular compositions.

Dry flowables or granules of the present invention are easy to prepare and store, have good dispersibility and suspensibility under storage conditions. The use of an additive in obtaining said stable insecticidal composition without water, circumvents moisture responsible for degradation of moisture sensitive active like acephate, and compaction below melting point of low-melting pyrethroids (i.e. 30-58 degree Celsius) avoids the cementing problem that occurs due to melting and gradual cooling during temperature variation in the process and on storage.

Thus, in an aspect, the present invention may provide a stable agrochemical composition comprising:
  a) at least one low melting active ingredient;
  b) at least one moisture sensitive active ingredient; and
  c) an additive;
characterised in that said additive has a softening point or melting point lower than the melting point of the low melting active ingredient.

In another aspect, the present invention may provide a stable insecticidal composition comprising:
  a) at least one low melting pyrethroid;
  b) at least one moisture sensitive insecticide; and
  c) an additive;
characterised in that said additive has a softening point or melting point lower than the melting point of the low melting pyrethroid.

In an embodiment, the low melting active ingredient of the present invention may be selected from insecticides, attractants, sterilants, bactericides, acaracides, nematicides, fungicides, growth regulators, herbicides, fertilizers and mixtures.

In a preferred embodiment, the low melting active ingredient of the present invention is selected from insecticides, attractants, sterilants, bactericides, acaracides, nematicides, fungicides and growth regulators.

In an embodiment the low melting active ingredient of the present invention is selected from nitrothal-isopropyl, myclobutanil, piproctanyl bromide, jodfenphos, Imazalil, lambda-cyhalthrin, triflumizole, vamidothion, xylylcarb, tolclofos-methyl, prothoate, pyriproxyfen, propamocarb hydrochloride, tefluthrin, resmethrin, chlorpropham, cloethocarb, demeton-S, cyfluthrin, cypermethrin, azinphos-ethyl, azinphos-methyl, benalaxyl, benazolin-ethyl, butocarboxim, benzoximate, bioresmethrin, bromopropylate, borax, biphenyl, fluoroglycofen-ethyl, fenbucarb, fenthiocarb, fensulfothion, fosmethilan, furalaxyl, dikegulac, trinexapac-ethyl, ethiofencarb, etridiazole, fenamiphos, fenazaquin, EPN, dodemorph, mecarphon, etaconazole, fluorbenside, furmecyclox, fenfluthrin, fluenetil, acequinocyl, schradan, transfluthrin, cyprodinil, phosfolan, crufomate, chlorphoxim, chloropropylate, di-allate, chlorofenprop, camphechlor, chiorbenside, chlordimeform, phosphonic acid, trifloxystrobin, picoxystrobin, gamma-cyhalothrin, codlemone, spinetoram, cyflumetofen.

In an embodiment, the low melting active ingredient of the present invention is selected from strobilurins or pyrethroids.

The low melting pyrethroid may be selected from but not limited to cypermethrin, fenvalerate, permethrin, alphacypermethrin, betacypermethrin, zetacypermethrin, deltamethrin, cyfluthrin, bifenthrin, lambda-cyhalothrin, and/or bioresmethrin or mixtures thereof.

In another preferred embodiment of the present invention, the low melting pyrethroid is selected from bifenthrin, cypermethrin, alpha-cypermethrin, beta-cypermethrin, and zeta-cypermethrin.

Thus, in another preferred embodiment, the low melting pyrethroid may be bifenthrin.

In an embodiment, the low melting strobilurin may be selected from trifloxystrobin or picoxystrobin.

In an embodiment, the present invention may provide a stable agrochemical composition comprising from about 0.1% to about 30% w/w and preferably from about 0.2% to about 20% w/w low melting pyrethroid, of the total weight of the stable agrochemical composition.

Another embodiment of the present invention may provide a stable insecticidal composition comprising from about 0.1% to about 30% w/w and preferably from about 0.2% to about 20% w/w low melting pyrethroid, of the total weight of the stable insecticidal composition.

In a preferred embodiment of the present invention, the stable insecticidal composition comprises from about 1% to about 10% w/w low melting pyrethroid, of the total weight of the stable insecticidal composition.

In an embodiment, the moisture sensitive active ingredient present within the compositions may be selected from organophosphorus insecticides.

In an embodiment, the moisture sensitive organophosphorus insecticide may be selected from but not limited to acephate, azinphos-Methyl, carbofuran, chlorpyrifos, coumaphos, crufomate, dimethoate, ethoprop, famphur, fenamiphos, isofenfos, methamidophos, methidathion, methyl parathion, mevinphos, monocrotophos, metam sodium, phosalone, phosmet, phosphamidon, profenofos, TEPP, terbufos, tetrachlorvinphos, trichlorfon and combinations thereof.

The preferred organophosphorus insecticide may be selected from acephate, profenophos, phosphomidon or mixtures thereof.

Accordingly, an embodiment of the present invention may provide a stable insecticidal composition comprising from about 0.5% to about 95% w/w and preferably from about 10% to about 85% w/w organophosphorus insecticide of the total weight of the stable insecticidal composition.

In a preferred embodiment of the present invention, the stable insecticidal composition comprises from about 40% to about 85% w/w organophosphorus insecticide of the total weight of the stable insecticidal composition In an embodiment, the present invention comprises an additive that has a softening point or melting point lower than the melting point of the low melting active ingredient.

In another embodiment the present invention comprises an additive that has a melting point lower than the melting point of the low melting active ingredient.

In an embodiment the softening point of the additive is lower than its melting point of the low melting active ingredient.

In a preferred embodiment, the present invention comprises an additive that is water soluble.

In an embodiment, the additive of the present invention may be selected from but not limited to polyethylene glycol (PEG) 6000, PEG 4000, PEG 8000, Nonyl phenol 30 EO or high molecular weight ethoxylate or propoxylate of fatty acid, fatty acid alcohol, vegetable oils, polyvinyl alcohols, polyacrylates, starch, carboxymethyl cellulose, alginic acid, agar, gum arabic and xanthan gum.

In another embodiment, the additive of the present invention may be preferably selected from polyethylene glycol (PEG) 6000, PEG 4000, PEG 8000, vegetable oils, and cellulose ethers.

In a preferred embodiment, the additive of the present invention may be selected from polyethylene glycols.

In an embodiment, in the compositions according to the present invention, the additive is present in an amount from about 1% to about 30% by weight of the composition. Preferably the additive is present in an amount from about 3% to about 20% by weight of the formulation.

The stable insecticidal compositions of the present invention may further comprise one or more dispersants, wetting agents, fillers, surfactants, anticaking agents, pH-regulating agents, preservatives, biocides, antifoaming agents, colorants and other formulation aids.

The dispersants may be selected from ionic and nonionic dispersants to enable disintegration of granules in water with ease, such as salts of polystyrene sulphonic acids, salts of polyvinylsuiphonic acids, salts of naphthalenesulphonic acid/formaldehyde condensates, salts of condensates of naphthalenesulphonic acid, phenolsulphonic acid and formaldehyde, and salts of lignosulphonic acid, polyethylene oxide/polypropylene oxide block copolymers, polyethylene glycol ethers of linear alcohols, reaction products of fatty acids with ethylene oxide and/or propylene oxide, furthermore polyvinyl alcohol, polyvinylpyrrolidone, copolymers of polyvinyl alcohol and polyvinylpyrrolidone and copolymers of (meth)acrylic acid and (meth)acrylic esters, furthermore alkyl ethoxylates and alkylarylethoxylates ethoxylated alkylarylphosphated and sulphated ester. The preferred dispersing agents include derivative of ethoxylates of vegetable oil or a mixture of one or more of these; or styrene acrylic polymers or mixtures thereof.

The wetting agents may be selected from soaps; salts of aliphatic monoesters of sulphuric acid including but not limited to sodium lauryl sulphate; sulfoakylamides and salts thereof including but not limited to N-methyl-N-oleoyltaurate Na salt; akylarylsulfonates including but not limited to akylbenzenesulfonates; akylnaphthalenesulfonates and salts thereof and salts of ligninsulfonic acid.

In an embodiment fillers may be selected from insoluble fillers and soluble fillers.

In an embodiment, fillers may be selected preferably from precipitated silica and diatomaceous earth kaolin.

In an embodiment, it is preferred to prepare the insecticidal composition according to the invention as Dry Flowables (DF).

In an embodiment, suitable antifoams may, preferably be, silicones, long-chain alcohols and salts of fatty acids.

Suitable colorants (for example in red, blue and green) are, preferably, pigments, which are sparingly soluble in water, and dyes, which are water-soluble. Examples are inorganic coloring agents (for example iron oxide, titanium oxide, and iron hexacyanoferrate) and organic coloring agents (for example alizarin, azo and phthalocyanin coloring agents).

According to a preferred embodiment, the present invention may provide stable insecticidal compositions comprising acephate, bifenthrin and an additive that has a softening point or melting point lower than the melting point of the low melting active ingredient.

According to specific embodiments a stable insecticidal composition of the present invention may comprise from about 0.5% to about 95% w/w of acephate, from about 0.1% to about 30% w/w of bifenthrin, from about 1.0% to about 30% w/w of an additive that has a softening point or melting point lower than the melting point of the low melting active ingredient.

According to another specific embodiment, a stable insecticidal composition of the present invention may comprise from about 5.0% to about 80% w/w of acephate, from about 1.0% to about 20% w/w of bifenthrin, from about 5.0% to about 20% w/w of PEG 6000 as the additive.

According to an embodiment of the present invention, there is provided a stable agrochemical composition comprising acephate, trifloxystrobin and an additive that has a softening point or melting point lower than the melting point of the low melting active ingredient.

According to specific embodiments a stable agrochemical composition of the present invention may comprise from about 0.5% to about 95% w/w of acephate, from about 0.1% to about 30% w/w of trifloxystrobin, from about 1.0% to about 30% w/w of an additive that has a softening point or melting point lower than the melting point of the low melting active ingredient.

In another embodiment, the present invention provides a process for the preparing a stable agrochemical composition. The process comprises:
1) premixing at least one low melting active ingredient, at least one moisture sensitive active ingredient and an additive wherein the additive has a softening point or melting point lower than the melting point of the low melting active ingredient; and
2) subjecting the premix to compaction granulation.

In an embodiment, the process of the present invention comprises additional conventional steps, which may be necessary but not crucial to achieve the advantages of the present invention.

According to another embodiment of the present invention, in process for preparing the stable agrochemical composition, compaction granulation may take place in such a way that composition may be separately, sequentially or simultaneously subjected to compaction as well as to granulation.

In an embodiment, the present invention provides a process for the preparing a stable agrochemical composition. The process comprises:
1) premixing at least one low melting active ingredient, at least one moisture sensitive active ingredient and an additive wherein the additive has a softening point or melting point lower than the melting point of the low melting active ingredient; and
2) subjecting separately, sequentially or simultaneously, the premix to compaction as well as to granulation.

In a preferred embodiment, the process for preparation of the stable insecticidal composition comprise the following steps:
1) mixing an active ingredient selected from at least one low-melting pyrethroid with required quantity of a precipitated silica to obtain a premix;
2) milling the premix with or without other additives in the air-jet mill to obtain grounded low-melting pyrethroid of desired particle size;
3) adding to the grounded milled low-melting pyrethroid, organophosphorus active ingredient, and an additive wherein the additive has a softening point or melting point lower than the melting point of the low melting active ingredient and any other necessary additive(s) and mixing it to obtain a premix;
4) subjecting the premix to compaction granulation to obtain the granules.

The granules, thus obtained, are preferably tested for required quality specifications. Once the granules pass quality specification, they are preferably filled and packed in desired packing as dry flowables.

The premix of the low melting active ingredient and the moisture sensitive active ingredient and the additive can also be treated by pre-compaction followed by roller extrusion. This premixing of the moisture sensitive active ingredient and low melting active ingredient with the additive prevents the moisture sensitive active ingredient from deteriorating in the composition; and pre-compaction prevents melting of low melting active ingredients during extrusion process.

The composition of the present invention enjoy all the advantages discussed above, making it beneficial from an economic aspect and a handling aspect and shows a very good performance during application. As will be demonstrated in the examples, the composition of the present invention demonstrates good suspensibility, stability, dispersibility, and free flowability and passes the wet sieve test.

According to an embodiment, the present invention provides use of stable agrochemical composition comprising at least one low melting active ingredient, at least one moisture sensitive active ingredient and an additive wherein the additive has a softening point or melting point lower than the melting point of the low melting active ingredient, as an agrochemically active composition.

In an embodiment, the stable compositions according to the present invention are used as insecticides.

Accordingly, the stable insecticidal compositions of the present invention give a quick knockdown kill of the pests. It is especially a potent lethal weapon to kill hard-to-kill, especially *Lepidoptera, Coleoptra, Diptera, Hemiptera*, preferably, effective against crop insects like leps, stink bug and plant bug.

In an embodiment, the crops on which the compositions of the present invention may be used may be selected from but not limited to cereals, such as wheat, oats, barley, spelt, triticale, rye, maize, millet, rice, crops such as sugarcane, soybean, sunflower, rape, canola, tobacco, sugar beet, fodder beet; tuber crops such as potatoes, sweet potatoes etc., crops such as asparagus, hops etc.; fruit plants such as apples, pears, stone-fruits such as for example peaches, nectarines, cherries, plums, apricots, citrus fruits such as oranges, grapefruit, limes, lemons, kumquats, mandarins, satsumas; nuts such as pistachios, almonds, walnuts, pecan nuts, tropical fruits such as mango, papaya, pineapple, dates, bananas etc., grapes, vegetables such as endives, lambs, lettuce, fennel, globe and loose-leaf salad, chard, spinach, chicory, cauliflower, broccoli, Chinese cabbage, kale (winter kale or curly kale), kohlrabi, Brussel sprouts, red cabbage, white cabbage and savoy, fruiting vegetables such as aubergines, cucumbers, paprika, marrow, tomatoes, courgettes, sweetcorn, root vegetables such as celeriac, turnip, carrots, swedes, radishes, horse radish, beetroot, salsify, celery, pulses such as peas, beans etc., bulb vegetables such as leeks, onions etc., oil crops such as mustard, poppy, olives, sunflowers, coconut, castor oil plants, cocoa beans, groundnuts; fibre crops such as cotton, jute, flex, hemp, crops such as tea, coffee, rubber, ornamentals including shrubs and flowering plants, vines, rangeland and pastures.

In an embodiment, compositions of the present invention may be optionally mixed together with other insecticides, attractants, sterilants, bactericides, acaricides, nematicides, fungicides, growth regulators, herbicides, fertilizers and mixtures thereof.

In an embodiment, the present invention provides a method of controlling unwanted pests, said method comprising applying stable compositions according to the present invention to the pests or to their locus.

Thus, in an embodiment, the present invention may provide methods of controlling insect pests at a locus, said method comprising application of an insecticidally effective amount of a compositions comprising:
a) at least one low melting pyrethroid;
b) at least one moisture sensitive organophosphorus insecticide; and
c) an additive;
characterised in that said additive has a softening point or melting point lower than the melting point of the low melting pyrethroid.

In an embodiment, the present invention may provide methods of controlling insect pest such as those belonging to Lepidopteran, Coleoptran, Dipteran, Hemipteran classes of insecticides.

In another aspect, the present invention provides a kit. The kit comprises a plurality of components, each of which components may include at least one, or more, of the ingredients of the compositions of the present invention.

In an embodiment, the components of the kit may be admixed just prior to being used in any of the methods of use thereof described in this invention.

In an embodiment, the kit comprises an instruction manual that instructs a user of the kit to admix the components in the predefined quantities or in their predefined proportion prior to being used.

In an embodiment, the instruction manual directs the user of the kit to use the composition against predefined insects on certain predefined crops.

Accordingly, in an embodiment, the present invention provides a kit comprising:
(a) at least one low melting active ingredient component;
(b) at least one moisture sensitive active ingredient component; and (c) an additive component, characterised in that said additive has a softening point or melting point lower than the melting point of said low melting active ingredient.

In another embodiment, the present invention provides a kit comprising:
(a) at least one low melting pyrethroid component;
(b) at least one moisture sensitive insecticide component; and
(c) an additive component, characterised in that said additive has a softening point or melting point lower than the melting point of the low melting pyrethroid.

In an embodiment, the low melting active ingredient component of the present invention comprises strobilurins or pyrethroids.

The low melting pyrethroid may be selected from but not limited to cypermethrin, fenvalerate, permethrin, alphacypermethrin, betacypermethrin, zetacypermethrin, deltamethrin, cyfluthrin, bifenthrin, lambda-cyhalothrin, and/or bioresmethrin or mixtures thereof.

In another preferred embodiment of the present invention, the low melting pyrethroid is selected from bifenthrin, cypermethrin, alpha-cypermethrin, beta-cypermethrin, and zeta-cypermethrin.

Thus, in another preferred embodiment, the low melting pyrethroid may be bifenthrin.

In an embodiment, the low melting strobilurin may be selected from trifloxystrobin or picoxystrobin.

In an embodiment, the kit comprises instructions manual instructing the user to use from about 0.1% to about 30% w/w of the low melting pyrethroid component.

In an embodiment, the kit comprises the moisture sensitive active ingredient component selected from organophosphorus insecticides.

In an embodiment, the kit comprises an instruction manual instructing the user to use from about 0.5% to about 95% w/w of the organophosphorus insecticide component.

In an embodiment, the kit comprises an additive component, wherein the additive is selected from polyethylene glycol (PEG) 6000, PEG 4000, PEG 8000, Nonyl phenol 30 EO or high molecular weight ethoxylate or propoxylate of fatty acid, fatty acid alcohol, vegetable oils, polyvinyl alcohols, polyacrylates, starch, carboxymethyl cellulose, alginic acid, agar, gum arabic and xanthan gum.

In an embodiment, the kit comprises an instructions manual instructing the user to mix from about 1% to about 30% of the additive component.

According to a preferred embodiment, the present invention may provide a kit comprising an acephate component, a bifenthrin component and an additive component that has a softening point or melting point lower than the melting point of bifenthrin.

According to another preferred embodiment, the present invention provides a kit comprising an instructions manual instructing the user to admix from about 0.5% to about 95% w/w of the acephate component, from about 0.1% to about 30% w/w of bifenthrin component, and from about 1.0% to about 30% w/w of an additive that has a softening point or melting point lower than the melting point of bifenthrin.

According to another specific embodiment, the present invention provides a kit comprising acephate component instructed to be used from about 5.0% to about 80% w/w, bifenthrin component instructed to be used from about 1.0% to about 20% w/w, and PEG 6000 component instructed to be used from about 5.0% to about 20% w/w.

In an embodiment, the kit comprises acephate component, trifloxystrobin component and an additive component that has a softening point or melting point lower than that of trifloxystrobin.

In an embodiment, the kit comprises instructions for admixing from about 0.5% to about 95% w/w of the acephate component, from about 0.1% to about 30% w/w of trifloxystrobin component, and from about 1.0% to about 30% w/w of the additive component, wherein the additive has a softening point or melting point lower than the melting point of trifloxystrobin.

In an embodiment, the kit comprises instructions for use of the components of kit as insecticide or a fungicide.

In an embodiment, the kit comprises instructions for use of the components against *Lepidoptera, Coleoptra, Diptera, Hemiptera*, preferably against leps, stink bug and plant bug.

In an embodiment, the kit comprises instructions for use of the components in crops selected from cereals, such as wheat, oats, barley, spelt, triticale, rye, maize, millet, rice, crops such as sugarcane, soybean, sunflower, rape, canola, tobacco, sugar beet, fodder beet; tuber crops such as potatoes, sweet potatoes etc., crops such as asparagus, hops etc.; fruit plants such as apples, pears, stone-fruits such as for example peaches, nectarines, cherries, plums, apricots, citrus fruits such as oranges, grapefruit, limes, lemons, kumquats, mandarins, satsumas; nuts such as pistachios, almonds, walnuts, pecan nuts, tropical fruits such as mango, papaya, pineapple, dates, bananas etc., grapes, vegetables such as endives, lambs, lettuce, fennel, globe and loose-leaf salad, chard, spinach, chicory, cauliflower, broccoli, Chinese cabbage, kale (winter kale or curly kale), kohlrabi, Brussel sprouts, red cabbage, white cabbage and savoy, fruiting vegetables such as aubergines, cucumbers, paprika, marrow, tomatoes, courgettes, sweetcorn, root vegetables such as celeriac, turnip, carrots, swedes, radishes, horse radish, beetroot, salsify, celery, pulses such as peas, beans etc., bulb vegetables such as leeks, onions etc., oil crops such as mustard, poppy, olives, sunflowers, coconut, castor oil plants, cocoa beans, groundnuts; fibre crops such as cotton, jute, flex, hemp, crops such as tea, coffee, rubber, ornamentals including shrubs and flowering plants, vines, rangeland and pastures.

Inventors of the present invention succeeded in preparing stable composition by careful combination of the at least one moisture sensitive active ingredient, at least one low-melting active ingredient and an additive wherein the additive has a softening point or melting point lower than the melting point of the low melting active ingredient and process of preparing the same. The optimum concentration of the actives as well as formulation ingredients which led to the stable DF formulation has been arrived at by the experiments as exemplified below.

These examples are merely illustrations and are not to be understood as limiting the scope and underlying principles of the invention in any way. Indeed, various modifications of the invention in addition to those shown and described herein will become apparent to those skilled in the art from the following examples and foregoing description.

While foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

EXPERIMENTAL EXAMPLES

The following examples illustrate the basic methodology and versatility of the invention.

Example 1: 74% w/w Acephate and 6% w/w Bifenthrin DF was Prepared as Follows

| Ingredients | Quantity (g) |
|---|---|
| Acephate | 76.02 |
| Bifenthrin | 6.63 |
| Castor oil ethoxylate | 4 |
| PEG-6000 | 11.50 |
| Precipitated silica (PPT silica) | 1.85 |
| Total | 100.00 |

Procedure: Bifenthrin technical was mixed with precipitated silica to prepare bifenthrin premix. The bifenthrin premix was milled in airjet mill to obtain desired particle size, Acephate, castor oil ethoxylate, PEG-6000 and precipitated silica were added to the bifenthrin premix to obtain bifenthrin-acephate premix. Bifenthrin-acephate premix was then subjected to compaction granulation by passing said premix through roller extruder to get the granules by multiple passing below melting point of bifenthrin.

Example 2: 74% w/w Acephate and 6% w/w Bifenthrin DF was Prepared a Follows

| Ingredients | Quantity (g) |
|---|---|
| Acephate | 76.02 |
| Bifenthrin | 6.63 |
| Metasperse 550S | 3.00 |
| Castor oil ethoxylate | 2.5 |
| Dialkyl naphthalene sulphonate sodium salt | 1.00 |
| PEG-6000 | 9.00 |
| PPT silica | 1.85 |
| Total | 100.00 |

Procedure: Bifenthrin was mixed with silica to prepare bifenthrin premix. The premix was milled in airjet mill to obtain desired particle size. Acephate, Metasperse 550S, Castor oil ethoxylate, Dialkyl naphthalene sulphonate sodium salt PEG 6000 and precipitated silica were added to the bifenthrin premix to obtain bifenthrin-acephate premix. Bifenthrin-acephate premix was then subjected to compaction granulation by passing said premix through roller extruder to get the granules by multiple passing below melting point of bifenthrin.

Example 3: 74% w/w Acephate and 6% w/w Bifenthrin DF was Prepared as Follows

| Ingredients | Quantity (g) |
|---|---|
| Acephate | 76.02 |
| Bifenthrin | 6.53 |
| Metasperse 550S | 3.00 |
| Dialkyl naphthalene sulphonate sodium salt | 1.00 |
| PEG-8000 | 13.10 |
| PPT silica | 0.35 |
| Total | 100.00 |

Procedure: Bifenthrin was mixed with silica to prepare bifenthrin premix. The bifenthrin premix was milled in airjet mill to obtain desired particle size. Acephate, Metasperse 550S, Dialkyl naphthalene sulphonate sodium salt, PEG 8000 and precipitated silica were added to the bifenthrin premix to obtain bifenthrin-acephate premix. Bifenthrin-acephate premix was then subjected to compaction granulation by passing said premix through roller extruder to get the granules by multiple passing below melting point of bifenthrin.

Example 4: 74% w/w Acephate and 6% w/w Beta-Cypermethrin DF was Prepared as Follows

| Ingredients | Quantity (g) |
|---|---|
| Acephate | 76.02 |
| Beta-cypermethrin | 6.53 |
| Metasperse 550S | 3.00 |
| Dialkyl naphthalene sulphonate sodium salt | 2.00 |
| PEG-4000 | 9.00 |
| Ammonium sulphate | 3.10 |
| PPT silica | 0.35 |
| Total | 100.00 |

Procedure: Beta-cypermethrin was mixed with silica to prepare beta-cypermethrin premix. The beta-cypermethrin premix was milled in airjet mill to obtain desired particle size. Acephate, Metasperse 550S, Dialkyl naphthalene sulphonate sodium salt, PPT silica, Ammonium Sulphate and PEG 4000 were added to the beta-cypermethrin premix to obtain beta-cypermethrin-acephate premix. Beta-cypermethrin-acephate premix was then subjected to compaction granulation by passing said premix through roller extruder to get the granules by multiple passing below melting point of bifenthrin.

Example 5: 74% w/w Acephate and 6.5% w/w Trifloxystrobin DF was Prepared as Follows

| Ingredients | Quantity (g) |
|---|---|
| Acephate | 76.02 |
| trifloxystrobin | 7.04 |
| Metasperse 550S | 3.00 |
| Dialkyl naphthalene sulphonate sodium salt | 2.00 |
| PEG-6000 | 9.00 |
| ammonium sulphate | 2.59 |
| PPT silica | 0.35 |
| Total | 100.00 |

Procedure: Trifloxystrobin was mixed with silica to prepare Trifloxystrobin premix. The trifloxystrobin premix was milled in airjet mill to obtain desired particle size. Acephate, Metasperse 550S, Dialkyl naphthalene sulphonate sodium salt, PPT silica, ammonium sulphate and PEG 6000 were added to the trifloxystrobin premix to obtain trifloxystrobin-acephate premix. Trifloxystrobin-acephate premix was then subjected to compaction granulation by passing said premix through roller extruder to get the granules.

Stability Data

Test for Dispersibility

Compositions (Examples 6-10) according to the present invention were tested for stability. The samples were prepared using varied quantities of the active ingredients and other ingredients as listed in the below table (Table 1). The samples were prepared as per the process given in Example 1. The samples were tested for dispersibility by observing the number of inversion required to achieve complete dispersion.

TABLE 1

| Ingredients | Example 6 | Example 7 | Example 8 | Example 9 | Example 10 | Example 11 |
|---|---|---|---|---|---|---|
| Acephate | 76.02 | 76.02 | 76.02 | 76.02 | 76.02 | 76.02 |
| Bifenthrin | 6.63 | 6.53 | 6.63 | 6.63 | 6.63 | 6.53 |
| Additive* | 11.50 | 13.10 | 7.50 | 10.00 | 3.00 | 9.00 |
| PPT silica | 1.85 | 0.35 | 2.85 | 1.85 | 3.85 | 0.35 |
| Castor oil ethoxylate | 4.00 | — | — | 2.00 | 4.5 | — |
| Soprophor-4D384 | — | — | 3.00 | 2.00 | — | — |
| Dialkyl naphthalene sulphonate sodium salt | — | 1.00 | — | 1.50 | 1.00 | 2.00 |
| Metasperse 550S | — | 3.00 | — | — | 3.00 | 3.00 |
| Ammonium sulfate | — | — | 4.0 | — | 2.00 | 3.10 |
| No. of Inversions | 15 | 13 | 12 | 13 | 12 | 12 |

*the additive is selected from PEG 6000, PEG 4000 and PEG 8000

Number of inversion required to achieve complete dispersion of the granules was determined by the following procedure: A graduated cylinder of 250 ml was taken and 2 gm sample was added to the cylinder. It was allowed to soak for 2 min. The graduated cylinder was then closed by putting stopper and tilted to 180° C. and brought back to the original position in 2 seconds.

It was observed that the compositions of the present invention achieved good dispersion in approx. 12-15 inversions and is highly suitable for storage.

Test for Suspensibility and Stability of the Active Ingredient

The DF formulations prepared according to the present invention were investigated for suspensibility, degradation of active ingredient as well as its effect on stability of the composition. Samples (Examples 7 and 11) were prepared as per Example 1.

The samples were kept at 54±2° C. for up to 14 days and stability parameters such as suspensibility, wet sieve analysis and degradation of active ingredients were tested. The results are summarized in Table 2.

TABLE 2

| Physico/chemical property | Example 7 | | Example 11 | |
|---|---|---|---|---|
| | 0 days | 14 days | 0 days | 14 days |
| % Acephate | 74.35 | 72.77 | 74.42 | 71.55 |
| % Bifenthrin | 6.18 | 6.07 | 6.22 | 6.13 |
| Wet sieve analysis (retention on 75µ test sieve) | 0.02 | 0.1 | 0.002 | 0.003 |
| No. of Inversions | 13 | 13 | 12 | 11 |
| Suspensibility | 97 | 95 | 94 | 93 |
| Availability of Bifenthrin | 5.99 | 5.77 | 5.85 | 5.71 |

As clear from Table 2, degradation of active acephate and active bifenthrin in DF composition was not observed when kept at of 54±2° C. for 14 days. There was no significant change in the suspensibility of the formulation, maintaining that the formulations according to the present invention are stable according to the physico-chemical parameters. This signifies that the DF or the granular composition of acephate and bifenthrin so obtained has not only excellent stability of the active ingredients but also retains the dispersibility and hence the availability of the active ingredients for the intended use. It is further established by the result of wet sieve analysis that the crystal modification of bifenthrin has been prevented. The combination of actives and excipients prepared according to the process disclosed in the present invention leads to the stable DF composition which does not undergo any chemical and physical changes on storage and is also easy to handle for further use.

A comparative sample (Example 12) was prepared without the additive of the present invention for comparison purpose. The sample was tested for dispersibility by observing the number of inversion required to achieve complete dispersion.

| Ingredients | Example 12 |
|---|---|
| Acephate | 76.02 |
| Bifenthrin | 6.33 |
| PEG-6000 | 0.00 |
| PPT silica | 1.00 |
| Castor oil ethoxylate | 0.00 |
| Soprophor-4D384 | — |
| Dialkyl naphthalene sulphonate sodium salt | 2.00 |
| Metasperse 550S | 3.00 |
| Ammonium sulfate | 11.65 |
| No. of Inversions | >30 |
| Wet sieve analysis (retention on 75µ test sieve) | 3.52% w/w |
| Suspensibility | 45.8% w/w(as bifenthrin) |
| Availability of Bifenthrin | 45.8% of total active |

It has been observed that the sample (Example 12) prepared without an additive which has a softening point or melting point lower than the melting point of the low melting active ingredient could not provide a good dispersion. Therefore the formulation failed in delivering the required dispersibility and resulted in an unstable formulation.

Test for Availability of Bifenthrin for Insecticidal Activity

The DF formulations prepared according to the present invention were further investigated for finding out the amount of bifenthrin remain available for acting as an insecticide. The suspensibility of a formulation can be directly extrapolated to the active ingredient remain available for the intended use of the active ingredient. Formulations prepared according to the present invention tested for suspensibility in comparison with formulations prepared without additives. The samples were prepared as per example 1 and kept at 54±2° C. for 14 days and suspensibility was measured.

A review of table 3 given below reveals that, for examples 15-17 prepared according to the present invention, the suspensibility measured was unexpectedly high which obviously indicates that the formulation can be effectively used for the intended insecticidal activity. The % availability of bifenthrin achieved is same as that of the initial concentration of bifenthrin in the formulation. In the case of Examples 13-14 which were prepared without the additive, the measured suspensibility was very low which indicates that the available bifenthrin is only about 50% of what is expected from those formulations.

TABLE 3

Availability of bifenthrin in the formulations

| Examples | Acephate (g) | Bifenthrin (g) | Additive* (g) | Suspensibility of Bifenthrin | availability of Bifenthrin (g) |
|---|---|---|---|---|---|
| Example13 | 76.0 | 6.6 | 0.0 | 58 | 3.83 |
| Example14 | 76.0 | 6.6 | 0.0 | 52 | 3.43 |
| Example15 | 76.0 | 6.6 | 1.5 | 95 | 6.27 |
| Example16 | 76.0 | 6.5 | 12.0 | 96 | 6.24 |
| Example17 | 78.0 | 5.5 | 2.5 | 94 | 5.17 |

*the additive is selected from PEG 6000, PEG 4000 and PEG 8000

Inventors of the present invention thus successfully prepared formulation of a low melting active ingredient which is prone to undergo morphological changes along with a moisture sensitive agrochemical. The compositions according to the present invention were found to be stable as well as efficacious for the intended use.

The invention claimed is:

1. An agrochemical composition comprising:
   a) about 0.1% w/w to about 30% w/w of bifenthrin;
   b) about 0.5% w/w to about 95% w/w of at least one moisture sensitive active ingredient selected from the group consisting of acephate, azinphos-methyl, carbofuran, chlorpyrifos, coumaphos, crufomate, dimethoate, ethoprop, famphur, fenamiphos, isofenfos, methamidophos, methidathion, methyl parathion, mevinphos, monocrotophos, metam sodium, phosalone, phosmet, phosphamidon, profenofos, TEPP, terbufos, tetrachlorvinphos, trichlorfon and combinations thereof; and
   c) about 1% w/w to about 30% w/w of an additive selected from the group consisting of polyethylene glycol (PEG) 6000, PEG 4000 and PEG 8000.

2. The composition according to claim 1, wherein said at least one moisture sensitive active ingredient is acephate.

3. The composition according to claim 2, wherein the composition comprises:
   a) about 1.0% w/w to about 20% w/w of bifenthrin;
   b) about 5.0% w/w to about 80% w/w of acephate; and
   c) about 5.0% to about 20% w/w of PEG 6000.

4. The composition according to claim 1, wherein the composition is a Dry Flowable (DF) formulation.

5. A kit comprising:
   a) about 0.1% w/w to about 30% w/w of bifenthrin;
   b) about 0.5% w/w to about 95% w/w of at least one moisture sensitive active ingredient selected from the group consisting of acephate, azinphos-methyl, carbofuran, chlorpyrifos, coumaphos, crufomate, dimethoate, ethoprop, famphur, fenamiphos, isofenfos, methamidophos, methidathion, methyl parathion, mevinphos, monocrotophos, metam sodium, phosalone, phosmet, phosphamidon, profenofos, TEPP, terbufos, tetrachlorvinphos, trichlorfon and combinations thereof; and
   c) about 1% w/w to about 30% w/w of an additive selected from the group consisting of polyethylene glycol (PEG) 6000, PEG 4000 and PEG 8000.

6. The kit according to claim 4, wherein said at least one moisture sensitive active ingredient is acephate.

7. The kit according to claim 5, wherein the kit comprises:
   a) about 1.0% w/w to about 20% w/w of bifenthrin;
   b) about 5.0% w/w to about 80% w/w of acephate; and
   c) about 5.0% to about 20% w/w of PEG 6000.

* * * * *

UNITED STATES PATENT AND TRADEMARK OFFICE
CERTIFICATE OF CORRECTION

PATENT NO. : 10,660,337 B2
APPLICATION NO. : 15/991862
DATED : May 26, 2020
INVENTOR(S) : Pravin More et al.

It is certified that error appears in the above-identified patent and that said Letters Patent is hereby corrected as shown below:

On the Title Page

Item (72), in Line 4, delete "IN" for country of inventor Vikram Rajnikant Shroff and replace with --AE--, therefor.

Item (30), Foreign Application Priority Data, insert
--May 25, 2017 (IN) ................... 201731018461--.

Signed and Sealed this
Sixteenth Day of August, 2022

Katherine Kelly Vidal
*Director of the United States Patent and Trademark Office*